United States Patent [19]

Iwasaki et al.

[11] Patent Number: 5,213,722

[45] Date of Patent: May 25, 1993

[54] METHOD OF MAKING A SEPARATOR MATERIAL FOR A STORAGE BATTERY

[75] Inventors: Kazutaka Iwasaki; Munehisa Ikoma; Masakazu Ikeyama; Hiroshi Kawano; Isao Matsumoto, all of Osaka, Japan

[73] Assignee: Matsushita Electric Industrial Co., Ltd., Japan

[21] Appl. No.: 795,141

[22] Filed: Nov. 20, 1991

Related U.S. Application Data

[62] Division of Ser. No. 272,998, Nov. 17, 1988, Pat. No. 5,100,723.

[30] Foreign Application Priority Data

Nov. 17, 1987 [JP] Japan ................... 62-290015
Nov. 17, 1987 [JP] Japan ................... 62-290022
Nov. 17, 1987 [JP] Japan ................... 62-290023

[51] Int. Cl.$^5$ .......................... B05D 3/02; B32B 7/00; B32B 31/00
[52] U.S. Cl. .......................... 264/22; 264/83; 264/103; 264/136; 264/233; 264/344; 427/189; 427/248.1; 427/340; 427/400; 427/412.3; 427/254
[58] Field of Search .............. 264/22, 83, 103, 136, 264/232, 233, 324, 340, 344; 427/35, 189, 248.1, 340, 400, 412.3, 421, 429; 429/249, 254

[56] References Cited

U.S. PATENT DOCUMENTS 2,964,584 12/1960 Mendelsohn et al. .............. 429/249

FOREIGN PATENT DOCUMENTS 56-3973   1/1981 Japan ................... 429/254
57-191956 11/1982 Japan ................... 429/254
58-175256 10/1983 Japan ................... 429/254
952111    3/1964 United Kingdom ........ 429/254

Primary Examiner—Leo B. Tentoni
Attorney, Agent, or Firm—Lowe, Price, LeBlanc & Becker

[57] ABSTRACT

A method for making a separator material which is useful as a separator for storage batteries. The method involves applying a sulfonated surface layer to polyolefin resin fibers which form a woven or non-woven fabric. According to one embodiment, polyolefin resin fibers made of a first polyolefin resin are coated with a surface layer of a second polyolefin resin which is more susceptible to sulfonation than the first polyolefin resin from which said fibers are made. At the stage when the polyolefin fibers are coated with the second polyolefin resin they may be either individual fibers or formed into a woven or non-woven fabric. Thereafter, the fibers are subjected to a sulfonation process until the surface layer is sulfonated and a decomposition product formed by the sulfonation process is then removed from the fibers to obtain a separator material.

52 Claims, 3 Drawing Sheets

METHOD OF MAKING A SEPARATOR MATERIAL FOR A STORAGE BATTERY

This application is a divisional, application of application Ser. No. 07/272,998, filed Nov. 17, 1988 now U.S. Pat. No. 5,100,723.

BACKGROUND OF THE INVENTION

1. Field of the Invention

This invention relates to storage batteries and more particularly to, a material useful as a separator of the batteries. The batteries using the material as a separator exhibit a long life and can suppress self discharge to a minimum even when placed under high temperature conditions. The invention also relates to a method for making the separator material.

2. Description of the Prior Art

In recent years, various portable electronic devices or equipments have been drastically developed with an increasing necessity for memory backup for these devices. This brings about a great demand for batteries to be used as a power source for the devices. However, as the use of the batteries has been extended, there is a great possibility of the batteries being employed under severer use conditions, such as high temperature conditions, than those experienced ever before. Accordingly, there is a demand for improvements of the batteries or cells particularly with respect to life characteristics including a self discharge characteristic. In electronic devices, nickel-cadmium storage batteries have been frequently employed. The nickel-cadmium storage battery is known as a battery which undesirably involves a large self discharge. The improvement of the self discharge characteristic of the battery is one of problems to solve. For instance, when an ordinary nickel-cadmium battery has been allowed to stand at 45° C. after having been fully charged, the discharge capacity reduces to less than ⅓ of an initial capacity, leaving a problem in use immediately after the standing.

To solve the problem, studies on the self discharge characteristic particularly of nickel-cadmium storage batteries have been extensively made. The results of recent studies reveal that one of important factors of reducing the self discharge concerns with characteristics of a separator used in the battery. More particularly, it has been found that the increase of the self discharge owes greatly to the presence of impurities caused by decomposition of a polyamide fiber separator ordinarily used for this purpose.

Attention has now been paid to olefin resin fibers, such as polypropylene fibers, as a material for the separator. This is because the olefin resin fibers have a good heat resistance and are so stable that they do not decompose in highly concentrated alkaline solutions even at high temperatures. However, the olefin resin fibers are disadvantageous in that they are poor in hydrophilicity with an attendant problem that the liquid retention necessary for the separator is not satisfactory. For solving this problem, there have been proposed the following improvements of the polyolefin resin fibers where the fibers are imparted with hydrophilicity.

(1) Deposition of surface active agents on the fiber surfaces.

(2) Introduction of hydrophilic groups such as —COOH groups or —CHO groups to the resin fibers by irradiation of plasma.

(3) Graft polymerization of polyolefin resins with hydrophilic monomers, such as, for example, acrylic acid.

(4) Introduction of sulfonic groups (-$SO_3H$) into the resin fibers by immersion of the resin fibers into fuming sulfuric acid or concentrated sulfuric acid under proper temperature and concentration conditions.

However, these techniques involve the following problems or disadvantages.

With (1), since a separator placed in a highly concentrated alkaline aqueous solution at high temperatures contacts with oxygen gas generated at the positive electrode when the battery is overcharged, the surface active agent applied to the resin fibers separates from the fibers. The separated surface active agent dissolves in the alkaline aqueous solution where it serves as an impurity. This eventually facilitates the self discharge.

This is true of the cases of (2) and (3) where severe oxidation within the battery causes carboxylic acid ions and acrylic acid ions to dissolve in the alkaline aqueous solution, respectively. These ions increase the self discharge of the battery.

In contrast, with (4), little impurities or ions dissolve in the aqueous alkaline solution as in (1) to (3), so that the introduction of sulfate groups in very effective in suppressing the self discharge. However, when fibers made of one kind of polyolefin resin are used or polyolefin resin fibers whose inside is susceptible to oxidation are used, uniform sulfonation has to be effected within a very narrow range of treating conditions including a temperature and a concentration of fuming or concentrated sulfuric acid, and an immersion time. The sulfonation under these severe conditions is very difficult to carry out in an industrial sense, thus being not advantageous from the standpoint of industrial feasibility. Moreover, although it is important that the resin fibers have hydrophilic groups substantially uniformly distributed throughout the fibers for use as a separator, polyolefin resins have generally unsaturated hydrocarbon moieties susceptible to sulfonation, which are distributed only non-uniformly. If the fibers are sulfonated as a whole, the fibers will be sulfonated or oxidized to the inside thereof. In an extreme case, the inside portions may suffer carbonization. This results in a lowering of mechanical strength of the separator itself. Especially, when bonding portions of the fibers are carbonized, the lowering of the mechanical strength becomes considerable, thus presenting a serious problem.

SUMMARY OF THE INVENTION

It is accordingly an object of the present invention to provide a composite material which is particularly useful in improving characteristics of storage batteries when used as a separator therefor.

It is another object of the invention to provide a composite material which exhibits good mechanical strength and good hydrophilic properties when used as a separator of storage batteries whereby the self discharge of the battery can be reduced to a minimum.

It is a further object of the invention to provide a composite material for a separator of storage batteries which is made of a woven or non-woven fabric sheet and a surface layer formed on individual fibers of the fabric and made of a sulfonated polyolefin whereby the batteries using the composite material as a separator are particularly effective in suppressing the self discharge.

It is a still further object of the invention to provide a separator material which is made of a fabric sheet of polypropylene fibers which have individually a surface treated and sulfonated layer thereon.

It is another object of the invention to provide a method for making a composite or separator material for a separator of storage batteries.

The above objects can be achieved, according to one embodiment of the invention, by a material which is useful as a separator of storage batteries. The separator material comprises a woven or non-woven fabric sheet made of polyolefin resin fibers, and a surface layer of a sulfonated polyolefin resin formed on surfaces of the individual fibers of the fabric sheet. Preferably, the surface layer is made of a polyolefin resin different in kind from the polyolefin resin used as the fabric sheet because of the ease in preparation. Especially when polyproylene is used as the fibers, the surface layer may be formed directly thereon by surface treatment of the individual polypropylene resin fibers and subsequent sulfonation of the treated layer. The batteries to which the material of the invention is applied as a separator may be any primary or secondary batteries of the closed or open type which includes a separator provided between a positive electrode and a negative electrode for separating the electrodes therebetween. Typically, nickel-cadmium storage batteries may be mentioned.

According to another embodiment of the invention, the separator material can be made by providing polyolefin resin fibers as they are or in the form of a woven or non-woven fabric sheet, forming on surfaces of the individual fibers a surface layer made of a polyolefin resin which is more susceptible to sulfonation than the first-mentioned polyolefin resin used as the fibers, forming a woven or non-woven fabric sheet from the thus formed fibers if the fibers are used in the preceding steps, subjecting the fabric sheet to sulfonation, and removing a decomposition product formed by the sulfonation from the fabric sheet to obtain a separator material having the sulfonated surface layer on individual polyolefin resin fibers. The removal of the decomposition product is effected by immersing the sulfonated sheet in water, a dilute sulfuric acid solution and/or an alkaline aqueous solution, and drying the immersed sheet. In general, the sulfonation is effected using an $SO_3$ gas or fuming or concentrated sulfuric acid until the surface layer is sulfonated.

Alternatively, the separator material may be made by providing polyolefin resin fibers as they are or in the form of a woven or non-woven fabric sheet, applying a dispersion of a sulfonated polyolefin resin on surfaces of the individual fibers of the fabric sheet, forming a woven or non-woven fabric sheet from the thus formed fibers if the fibers are used in the preceding steps, and subjecting the applied fabric sheet to thermal treatment to deposit the sulfonated polyolefin resin as a surface layer on the individual fibers.

Still alternatively, the separator material may be made by providing polypropylene resin fibers as they are or in the form of a woven or non-woven fabric sheet, subjecting the fabric sheet to surface treatment to form hydrophilic groups on the surfaces of the resin fibers, and subjecting the surface treated sheet to sulfonation thereby forming the fabric sheet having a sulfonated surface layer.

BRIEF DESCRIPTION OF THE INVENTION

DETAILED DESCRIPTION AND EMBODIMENTS OF THE INVENTION

Figure 1:
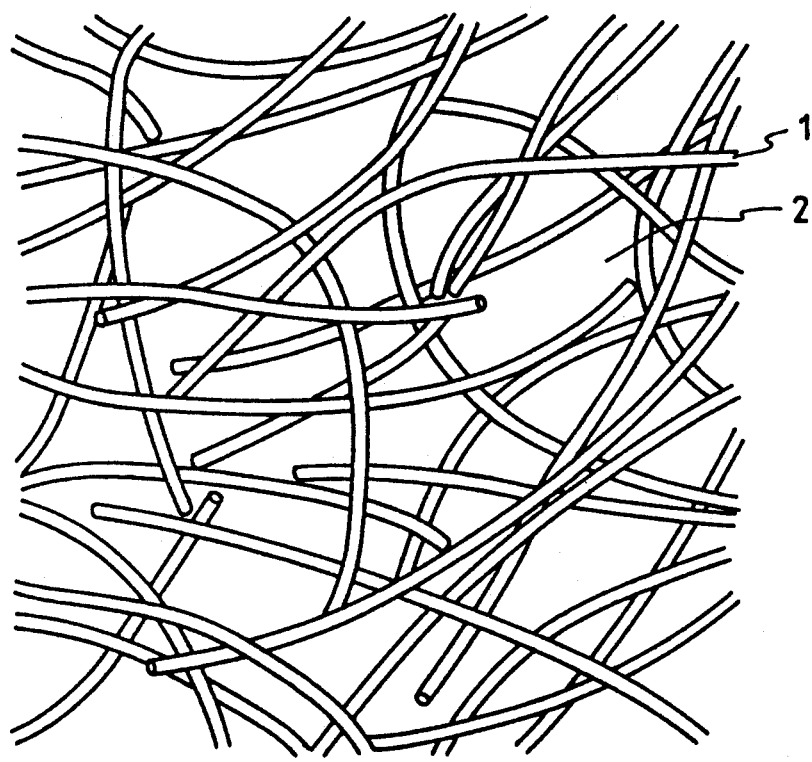
FIG. 1 is a schematic enlarged view of a separator material obtained in Example 1.

The separator material of the present invention which is adapted for use as a separator of various batteries includes a woven or non-woven fabric sheet mainly composed of polyolefin resin fibers. The fibers are individually formed with a polyolefin resin surface layer which has been sulfonated to an extent sufficient to impart an appropriate degree of hydrophilicity as will be described hereinafter.

The polyolefin resin fibers useful in the present invention may be fibers of any polyolefins such as polyethylene, polypropylene, ethylene-propylene copolymers, and the like. Of these, polypropylene and ethylene-propylene copolymers are preferred. The fabric sheet may further comprise, aside from the polyolefin fibers, fibers of polyester resins such as polyethylene terephthalate in small amounts not impeding the self discharge characteristic or mechanical strength when the material is applied as a separator of storage batteries. The amount of the polyester resin fibers is not larger than 5 wt % of the total amount of the fibers.

The fibers are not critical with respect to the length and fineness. These are determined depending on the purpose of the separator material or the woven or non-woven fabric sheet to be used. The thickness and basis weight of the woven or non-woven fabric sheet are not critical as well. Generally, the thickness is in the range of from 0.05 to 0.3 mm, preferably from 0.15 to 0.25 mm. The basis weight is generally in the range of from 30 to 100 g/m², preferably from 50 to 80 g/m².

The woven or non-woven fabric sheet should preferably be arranged such that the respective fibers which contact with one another are bonded by fusion at contacting portions. This may be effected by pressing polyolefin resin fibers at temperatures higher by about 5° C. than a melting point of the polyolefin used. The temperatures higher by 5° C. are favorable since the fibers are not completely melted during the pressing. The pressing may be carried out by hot pressing, hot roll pressing and the like techniques. By the bonding, the fabric sheet is imparted with satisfactory mechanical strength.

In the practice of the invention, the fibers of the woven or non-woven fabric sheet have individually a sulfonated surface layer. The surface layer may be made of a polyolefin resin which may be the same or different from the polyolefin resin used as the fibers, depending upon the manner of making the separator material. In general, a different type of polyolefin resin is used. In this case, the polyolefin resin used as the surface layer should preferably undergo sulfonation more readily than the polyolefin resin fibers because of the ease in fabrication of the separator material as will be described in more detail hereinafter. Preferred combinations of polyolefins used as the fibers and the surface layer include polypropylene or an ethylene-propylene copolymer used as the fibers in combination with polyethylene used as the surface layer. Moreover, if the fibers are made of polypropylene, an ethylene-propylene copolymer may be used as a surface layer.

In a specific case where it is essential to use polypropylene resin fibers, the surface layer may be formed without use of any other resin, i.e. the individual fibers are directed surface treated to form a hydrophilic layer having hydrophilic groups such as OH and COOH groups thereon. This hydrophilic layer is subsequently sulfonated to form a sulfonated surface layer. The surface treatment is effected by irradiation of plasma or by sputtering. The surface-treated fibers may be sulfonated by procedures described hereinafter.

In either case, the amount of the sulfone groups formed on the fibers is preferably in the range of from 0.05 to 2 milli-equivalents/g of the total of the resin fibers and the surface layer, more preferably from 0.1 to 1 milli-equivalents/g. If the amount is less than 0.05 milli-equivalents/g, the resultant separator material tends to become low in hydrophilicity. Over 2 milli-equivalents/g, the separator material becomes so hydrophilic that when it is applied as a separator of a sealed-type battery, the amounts of an electrolytic solution retained in positive and negative electrodes and the separator are not well balanced, thus adversely influencing the properties of the battery.

The separator material of the invention can be made by several methods including: (1) a method wherein polyolefin resin fibers having a surface layer of a polyolefin resin different from the fiber resin are sulfonated to obtain a composite material having a sulfonated resin surface layer on the individual resin fibers; (2) a method wherein polyolefin resin fibers are applied with a dispersion of sulfonated polyolefin resin particles in a suitable organic solvent and thermally treated to form a surface layer of the sulfonated polyolefin resin; and (3) a method wherein polypropylene resin fibers are subjected to surface treatment such as by irradiation with plasma or by sputtering to form a surface layer having hydrophilic groups on or in the surfaces of the fibers and subsequently to sulfonation to form a sulfonated surface layer on the individual fibers. In the methods (1), (2) and (3), the polyolefin resin fibers may be formed with the surface layer prior to or after formation of a woven or non-woven fabric sheet. More particularly, the fabric sheet may be initially formed from resin fibers and the individual fibers of the fabric sheet are subjected to subsequent treatments including the application of the dispersion and/or the sulfonation. Alternatively, the resin fibers may be first subjected to the treatments after which the treated fibers are formed into a woven or non-woven fabric sheet. The methods (1) to (3) are described.

In the method (1), polyolefin resin fibers having a surface layer are first provided as they are or in the or in the form of a woven or non-woven fabric sheet. The resin fibers having a surface layer may be composite fibers each having a core of a polyolefin resin and a sheath or surface layer of another polyolefin resin which is more susceptible to sulfonation than the first-mentioned polyolefin resin. This type of composite fibers may be formed by molding or by applying fibers of a polyolefin resin with another polyolefin resin, which is more susceptible to sulfonation, on surfaces of the individual fibers.

For the application of another polyolefin resin, the polyolefin resin fibers may be individually coated with a dispersion of particles of the more susceptible polyolefin resin as they are or after formation of a woven or non-woven fabric. If the resin fibers are used for the coating, the coated fibers are subsequently formed into a fabric sheet prior to subsequent sulfonation. The application of another polyolefin resin may be carried out by any known techniques including spraying, dipping, coating and the like of a dispersion of resin particles in a volatile solvent. In order to permit good dispersability of the particles, the size is preferably not smaller than 0.5 micrometers. In view of the case in deposition of the particles on the resin fibers, the size is preferably not larger than 2 micrometers. The volatile solvent may include tetrahydrofuran, dioxane and the like ethers. The dispersion should preferably have a concentration of the resin particles of from 40 to 70 wt %, preferably from 50 to 60 wt % in order to facilitate the application operations. The covering rate of the more susceptible polyolefin resin on the individual fibers may depend upon the interrelation between the retention of an electrolytic solution suitable as a separator and the hydrophilicity of a finally sulfonated surface layer. Preferably, the covering rate is not less than 85%, more preferably not less than 95%. If the coated fibers having a covering rate of less than 85% are sulfonated, there is a tendency that the resultant composite material is deficient in liquid retention.

In either case, the polyolefin resin used as the core is polypropylene or ethylene-propylene copolymers and the other polyolefin resin used as the surface layer, i.e. the sheath or surface layer, is polyethylene. This is because polyethylene is more susceptible to sulfonation than polypropylene or ethylene-propylene copolymers. If polypropylene is used as the core or starting fibers, ethylene-propylene copolymers may be used as the surface layer. The ethylene-propylene copolymers useful in the present invention should preferably have a propylene content of from 75 to 95 wt % of the copolymer. Although the surface layer is not critical with respect to the thickness, the thickness is preferably from 8 to 30 micrometers in view of the workability at the time of thermal bonding of the composite or coated fibers and production costs. The reason why polypropylene is preferably used as the core or starting fibers is that the polypropylene is less susceptible to sulfonation and can keep high mechanical strength after sulfonation.

It should be noted that although the manner of formation of the surface layer has been described above, limitation should not be imposed on the manner of the formation but the surface layer may be formed by any known techniques.

For the formation of a woven or non-woven fabric sheet, the composite fibers or starting resin fibers with or without formation of a surface layer on individual fibers are thermally bonded, as described before, by hot pressing or hot roll pressing preferably at temperatures higher by about 5° C. than the melting point of the polyolefin resin exposed as outside. By this, the mechanical strength of the fabric sheet increase. Once again, the fabric sheet should preferably have a thickness of from 0.05 to 0.3 mm, more preferably from 0.15 to 0.25 mm and a basis weight of from 30 to 100 g/m², more preferably from 50 to 80 g/m².

The fabric sheet of the fibers each having a surface layer is subsequently subjected to sulfonation. If the fibers have been used in the preceding steps, the fibers have to be formed, prior to the sulfonation, into a woven or non-woven fabric sheet in a manner described before. The sulfonation is effected by treating the fabric sheet by any known manner. For instance, the sheet is placed in an atmosphere containing an $SO_3$ gas, or is treated with fuming or concentrated sulfuric acid. When sulfur trioxide is used, the $SO_3$ is diluted with dry air or an inert gas such as $N_2$, Ar, He or the like. The concentration of the $SO_3$ gas is generally from 10 to 30 vol %, preferably from 15 to 25 vol %. If the concentration is less than 15 vol %, it takes a long treating time. Over 30 vol %, the surface layer is so sulfonated with the tendency toward carbonization. This will impede hydrophilicity. The sulfonation temperature is not critical and the sulfonation is generally effected at room temperature. The treating time may vary depending upon the concentration of the $SO_3$ gas and the type of polyolefin resin use d as the surface layer and is generally within a time of 3 to 30 minutes.

Alternatively, the sulfonation may be effected by immersing the sheet in fuming or concentrated sulfuric acid. In the case using fuming sulfuric acid, the following conditions are sufficient for the sulfonation: the concentration of the fuming sulfuric acid is from 10 to 80 wt %; the treating time is from 5 to 30 minutes; and the treating temperature is from 30° to 60° C.

By the sulfonation treatment, sulfone groups are formed in an amount of 0.05 to 2 milli-equivalents/g of the total of the resin fibers and the surface layer, preferably 0.1 to 1 milli-equivalents/g.

The fabric sheet subjected to the sulfonation should be subsequently immersed in water and dried, or in a diluted sulfuric acid, washed with water and dried in order to remove low molecular weight polyolefin decomposition products produced by side reactions. Although unreacted sulfur trioxide can be removed by the above immersion treatment, the removal can be fully and thus preferably accomplished when immersing the sheet in an alkaline aqueous solution such as, for example, potassium hydroxide and drying the immersed sheet. As a matter of course, the sulfonated sheet can first be immersed in water or a diluted sulfuric solution and then in an alkaline aqueous solution, followed by washing with water and drying. The drying is generally effected at a temperature of from 50° to 90° C.

The method (2) wherein sulfonated olefin resin particles are applied to polyolefin fibers or their woven or non-woven fabric sheet is described.

In this method, a dispersion of sulfonated polyolefin resin particles in a volatile solvent as used in the method (1) is used. Preferably, sulfonated polyolefin resin particles may be sulfonated polyethylene and sulfonated ethylene-propylene copolymers as in the method (1). Moreover, sulfonated polypropylene particles may be also used in this case because separately sulfonated polypropylene particles can be used as is different from the method (1). In view of the ease in the separate sulfonation, sulfonated polyethylene or ethylene-propylene copolymers are preferred. The particle size is preferably in the range of from 0.5 to 2.0 micrometers and the content of the resin particles is preferably in the range of from 40 to 70 wt %, more preferably from 50 to 60 wt %, for the reasons stated with respect to the method (1). The sulfonated polyolefin particles are dispersed in a solvent as used in the method (1). In this method, the dispersion may be applied to starting polyolefin resin fibers prior to or after formation of a woven or non-woven fabric sheet.

The dispersion is applied in such a way that the amount of sulfone groups is in the range of from 0.05 to 2 milli-equivalents/g of the total resins of the separator material, preferably from 0.1 to 1 milli-equivalents/g of the fibers. The application may be effected in a manner similar to the method (1). Subsequently, the applied fibers or fabric sheet is dried to obtain a composite separate material.

The separator material obtained by the method (3) is slightly different from those materials obtained in the methods (1) and (2) in that starting polyolefin fibers or woven or non-woven fabric sheets thereof are directly treated to form a hydrophilic surface layer having hydrophilic groups which are subsequently sulfonated. Thus, the resultant fibers or sheet having a sulfonated surface layer is something different from a composite material having a surface layer of a polyolefin resin which is different from the polyolefin resin used as a core.

The starting polyolefin resin fibers or fabric sheet thereof is subjected to surface treatment, for example, by irradiation of plasma or by sputtering to form hydrophilic groups, such as a hydroxyl group, a carboxyl group and the like, in the surfaces of the fibers or sheet. If the fibers are used, they are subsequently formed into a woven or non-woven fabric sheet in a manner described with respect to the methods (1) and (2). The plasma irradiation may be effected by ordinary techniques for surface treatment of plastic films or fibers under a reduced pressure of $10^{-2}$ to $10^{-3}$ mmHg for several to several tens minutes. The atmosphere of the plasma irradiation may be air and an inert gas such as argon, nitrogen and the like. The sputtering is also not specific but may be effected under ordinary conditions for the surface treatment of plastic films.

The surface-treated fibers are thermally bonded as in the methods (1) and (2). Subsequently, the fabric sheet is subjected to sulfonation in a manner described before. For instance, the sulfonation may be effected in an atmosphere containing sulfur trioxide, or in fuming or concentrated sulfuric acid. A desired degree of sulfonation as defined before can be readily attained. The sulfonated sheet is washed in a manner described in the method (1) and dried.

The present invention is more particularly described by way of examples. Comparative examples are also shown.

EXAMPLE 1

Assemblies of polypropylene fibers having an average size of about 15 micrometers and an average length of about 40 mm were loosened and formed into a web. A dispersion of polyethylene particles in tetrahydrofuran was uniformly applied over the web, by which adhesion of the fibers to one another was imparted. The web was passed between hot rolls at a temperature of 150° C. whereupon the fibers were thermally bonded. As a result, there was obtained a non-woven fabric sheet having a final thickness of 0.2 mm, a porosity of about 60% and an amount of the deposited polyethylene of about 20% based on the weight of the polypropylene fibers. The solvent dispersing the polyethylene particles was evaporated during the thermal bonding. Accordingly, the non-woven fabric sheet was substantially completely constituted of the polyolefin resins.

The fabric sheet had a polyethylene surface layer on individual fibers.

The non-woven fabric sheet was subsequently immersed in fuming sulfuric acid having a concentration of 20 wt % for about 20 minutes at a temperature of 35° C., followed by washing with water and drying to obtain a hydrophilic composite separator material. Thereafter, the sheet was again passed between pressing rolls to make a desired thickness.

Figure 2:
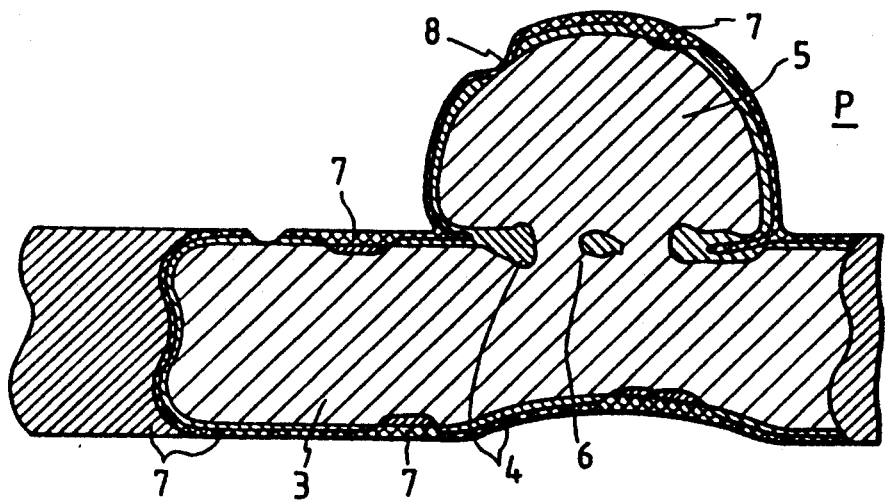
FIG. 2 is a schematic enlarged view, partially in section, of part of the composite material of FIG. 1 for illustration of the manner of sulfonation of fibers of the separator material.

FIG. 1 is a schematic microscopically enlarged view of the thus obtained non-woven fabric sheet. The sheet includes sulfonated polyolefin resin fibers 1 and spaces 2 formed among the fibers 1. Through microscopic observation, it was confirmed that a bonded portion of the fibers 1 was as shown in FIG. 2. In FIG. 2, there is shown a bonded portion P in which reference numeral 3 indicates a polypropylene fiber covered with a polyethylene layer 4. The horizontal fiber 3 as viewed in the figure bonds to another polypropylene fiber 5 at portions 6. The polyethylene layer 4 has a sulfonated layer 7 which rarely reaches the polypropylene fiber 3 or 5. Reference numeral 8 indicates a portion where the polyethylene layer 4 is very thin but sulfonation rarely reaches the inside fiber 5. This is considered for the reason that polypropylene is less likely to be sulfonated than polyethylene.

As the sulfonation proceeds excessively, the fibers are oxidized and finally carbonized, thus leading to a lowering of mechanical strength of the fabric sheet.

To check a degree of sulfonation, the above procedure was repeated except that the immersion time in the fuming sulfuric acid was changed. The resultant non-woven fabric sheets were each cut into pieces having a width of 20 mm and a length of 35 mm. The sample pieces were subjected to measurement where it was pulled along the length until broken to determine a breaking load. The results are shown in Table 1. For comparison, non-woven sheets made of polyethylene and polypropylene fibers with an average size of 15 micrometers, respectively, were sulfonated under the same conditions as used above. These sheets were also subjected to measurement of the breaking load. The results are also shown in Table 1. It will be noted that the values are each an average of five measurements.

TABLE 1

| Sample | Breaking Load (kg) Immersion Time (minutes) | | | | | | | |
|---|---|---|---|---|---|---|---|---|
| | 0 | 5 | 10 | 15 | 20 | 25 | 30 | 40 | 60 |
| Composite Material of Example 1 | 8.5 | 8.3 | 7.7 | 7.3 | 7.0 | 6.8 | 6.5 | 6.0 | 3.5 |
| Polyethylene alone | 6.4 | 5.8 | 3.2 | 1.5 | 0.5 | — | — | — | — |
| Polypropylene alone | 10.0 | 9.8 | 8.5 | 7.9 | 7.5 | 7.3 | 6.2 | 2.8 | 0.5 |

In an industrial sense, the breaking load should be about 6 kg or over. According to this standard, an immersion time of 40 minutes or below for sulfonation is allowed for the composite material of the invention, whereas the immersion time has to be within about 5 minutes for the polyethylene sheet and within about 30 minutes for the polypropylene sheet. These samples were evaluated with respect to hydrophilicity by a test wherein each sample was treated as follows: each sample was completely dried, allowed to stand under conditions of a temperature of 45° C., a relative humidity of 95 to 100% and a time of 2 hours, followed by measurement of an increase in weight to determine a water absorption. From this, the hydrophilic property was determined. The results of the test revealed that the composite material of the invention exhibited a degree of hydrophilicity not impeding ordinary charge and discharge cycles of storage batteries when the immersion time was 10 minutes or over. However, with the polypropylene sheet, the immersion time of about 25 minutes or longer was necessary since polypropylene was not readily sulfonated.

As will be apparent from the above results, the composite separator material of the invention is very advantageous for mass production since the immersion time is in a range of as wide as from 10 to 40 minutes. This is considered for the reason that when the polyolefin resin fibers having such a structure as described above are subjected to sulfonation, the polyethylene layer which is prepared from a lower hydrocarbon as a starting material is more readily sulfonated. The inside material of the polypropylene is not readily sulfonated since not only the polypropylene is a material which is rarely sulfonated, but also the fuming sulfuric acid does not reach the inside readily owing to the presence of the surface layer. Accordingly, the surface layer can be sulfonated substantially uniformly with a relatively short time. In addition, even though the immersion is continued over a relatively long time, the inside of the fibers is left unsulfonated, thus ensuring high mechanical strength. Since the fibers are thermally bonded at portions of the polypropylene as shown in FIG. 2, the strength does not lower by the sulfonation.

Similar results are obtained using a combination of polypropylene fibers and an ethylene-propylene copolymer as a surface layer and a combination of an ethylene-propylene copolymer as the fibers and polyethylene as a surface layer.

EXAMPLE 2

Figure 3:
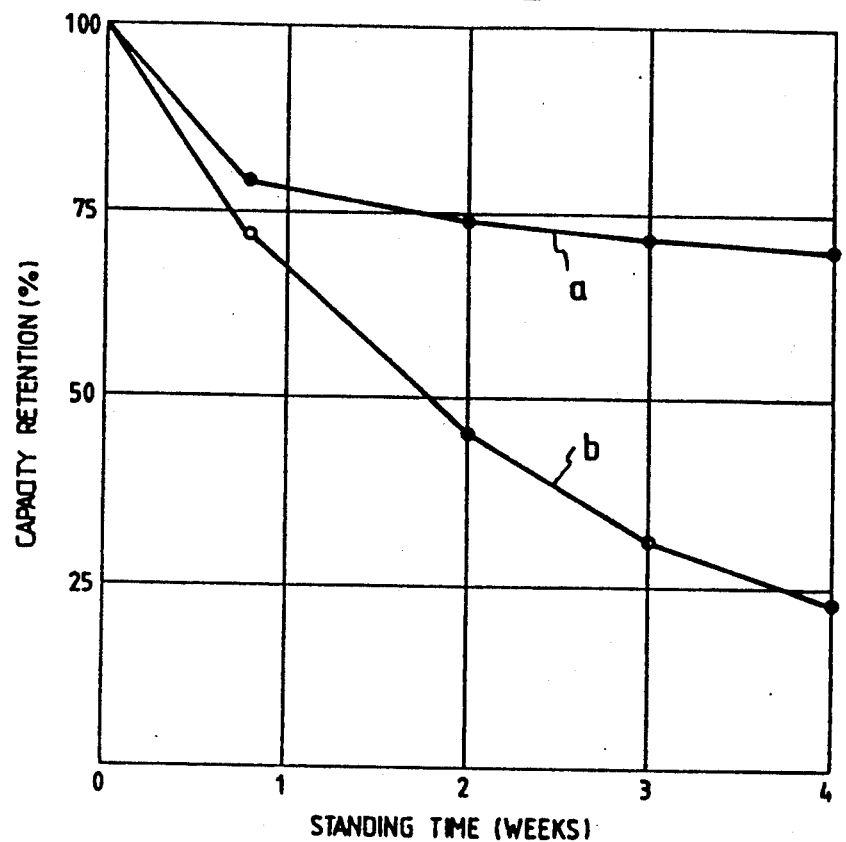
FIG. 3 is a graphical representation of a self discharge characteristic for nickel-cadmium storage batteries (AA size) using a separator of Example 2 and a known polyamide separator, respectively.

The composite material obtained in Example 1 was applied as a separator to a nickel-cadmium storage battery of a general-purpose AA size. The battery was fully charged and allowed to stand at 45° C. to check a self discharge characteristic. The results are shown in FIG. 3 as curve a.

For comparison, a polyamide separator ordinarily used for this purpose was applied to the same type of nickel-cadmium battery, followed by measurement of a self discharge characteristic. The results are shown in FIG. 3 as curve b. FIG. 3 shows a capacity retention in relation to the standing time by week. The results reveal that the self discharge of the nickel-cadmium battery using the composite material of the invention is very small, i.e. when the battery is allowed to stand at 45° C. for about one month, the discharge capacity is at a high level of approximately 70%.

It will be noted that the non-woven fabric sheets were made in Examples 1 and 2, similar results were obtained when a woven fabric sheet was used.

EXAMPLE 3 AND COMPARATIVE EXAMPLE 1

Assemblies of polypropylene fibers having an average size of about 15 micrometers and an average length of about 40 mm were loosened and formed into a web. The web was passed between hot rolls at a temperature of 150° C. whereupon the fibers were thermally bonded to one another. As a result, there was obtained a non-woven fabric sheet having a final thickness of 0.4 mm. The non-woven fabric sheet was placed in a reaction container for conducting a surface improving treatment using air plasma and the container was evacuated to a level of $10^{-3}$ mmHg. Thereafter, while air was passed into the container at a rate of 20 ml/min, the sheet was irradiated with plasma at a high frequency output of 100 W (frequency 13.56 MHz) for about 3 minutes to obtain a surface-treated non-woven fabric sheet. The thus obtained sheet was passed between hot rolls in the same manner as described above to obtain a sheet having a final thickness of 0.2 mm and a porosity of about 59%.

The non-woven fabric sheet was immersed in fuming sulfuric acid with a concentration of 20 vol % for about 20 minutes, followed by washing with water and drying to obtain a separator material exhibiting hydrophilicity (Example 3).

For comparison, the above procedure was repeated except that the plasma irradiation was not effected, thereby obtaining a sulfonated non-woven fabric sheet (Comparative Example 1).

In order to check the tendency toward sulfonation by irradiation of the plasma, the following evaluation test was made. The materials obtained in Example 3 and Comparative Example 1 wherein the same time of the immersion in the fuming sulfuric acid was used, and a known polyamide non-woven fabric sheet separator were each cut into a strip with a width of 50 mm. The tip of the strip was immersed in a 30 wt % potassium hydroxide aqueous solution for one minute, at which an average height of drawing up of the solution was determined. The results are shown in Table 2. Moreover, the general procedure of Example 3 was repeated using different irradiation times, thereby obtaining sulfonated non-woven fabric sheets. These sample sheets were also subjected to measurement of the height with the results shown in Table 2.

TABLE 2

| Sample | Height of Drawn-up Solution (mm/minute) Irradiation Time (minutes) | | | |
|---|---|---|---|---|
| | 0 | 3 | 10 | 15 |
| Separator Material Obtained in Example 3 | — | 30 | 29 | 31 |
| Material Obtained in Comparative Example 1 | 25 | — | — | — |
| Polyamide Non-woven Fabric Separator | 26 | | | |

The results of Table 2 reveal that the separator material obtained in Example 3 exhibits higher affinity for the electrolytic solution than the material obtained in Comparative Example 1 where no plasma irradiation was used and the known polyamide non-woven fabric sheet separator.

Presumably, this is because the separator material of Example 3 was modified on the surface thereof by the irradiation of plasma to have hydrophilic groups introduced thereon and was more susceptible to sulfonation. Although the immersion time was constant at 20 minutes, the sulfonation proceeded to an extent greater than the sulfonation in Comparative Example 3, resulting in a larger amount of sulfone groups.

Subsequently, the irradiation time was evaluated from the standpoint of hydrophilicity. The separator material of the invention exhibited such a degree of hydrophilicity as not to impede the cycles of a battery when the irradiation time was 3 minutes or over.

Moreover, the separator material obtained in Example 3 was applied as a separator to a nickel-cadmium storage battery of a general-purpose AA size and subjected to measurement of a self discharge characteristic in the same manner as in Example 2. As a result, it was found that the battery using the separator of the invention exhibited a high capacity retention of about 70% after having been allowed to stand at 45° C. for about 1 month.

From these results, the separator material of the invention will be found to be advantageous in that the sulfonation is facilitated by irradiation of plasma within a relative short time and the material has good affinity for electrolytic solutions. In addition, when applied to storage batteries, the self discharge characteristic is significantly improved.

In the above example, air was used for the plasma irradiation, and similar results were obtained using an argon gas. Further, similar results were also obtained when the surface modification was effected by sputtering and the non-woven fabric sheet was replaced by a woven fabric sheet.

EXAMPLES 4, 5 AND 6 AND COMPARATIVE EXAMPLE 2

Assemblies of polypropylene fibers having an average size of about 15 micrometers and an average length of about 40 mm were loosened, dispersed and formed into a web. A dispersion of polyethylene particles in tetrahydrofuran was uniformly applied over the web, by which adhesion of the fibers to one another was imparted. The web was passed between hot rolls at a temperature of 150° C. whereupon the fibers were thermally bonded. As a result, there was obtained a non-woven fabric sheet having a thickness of 0.2 mm, a porosity of about 60% and an amount of the deposited polyethylene of about 20% based on the weight of the polypropylene fibers. The solvent dispersing the polyethylene particles was evaporated during the thermal bonding. Accordingly, the non-woven fabric sheet was substantially completely constituted of the polyolefin resins. The fabric sheet had a polyethylene surface layer on the individual fibers.

The fabric sheet with a thickness of 0.2 mm and a basis weight was cut into pieces with a size of 50×200 mm and spirally wound through a fluororesin net, followed by accommodation in a reaction container. The container was subsequently evacuated, after which a nitrogen gas containing 20 vol % of a sulfur trioxide ($SO_3$) gas was introduced into the container to an atmospheric pressure followed by reaction at 25° C. for 5 minutes. Thereafter, air was introduced into the container to completely remove the reaction gas from which the non-woven fabric sheet was removed. Thus, the sulfonated sheet was obtained, which was subjected to the following after-treatment to obtain a composite material having good hydrophilicity.

After-Treatment:

(A) The sheet was immersed in running water for about 10 minutes and dried at about 70° C. (Example 4).

(B) After immersion in running water for about 10 minutes, the sheet was further immersed in an about 10 wt % potassium hydroxide aqueous solution for 15 minutes, washed with water, and dried at about 70° C. (Example 5).

(C) After immersion in an about 10% dilute sulfuric acid aqueous solution for about 10 minutes, the sheet was washed with water and dried at about 70° C. (Example 6).

(D) No after treatment (Comparative Example 2).

COMPARATIVE EXAMPLES 3, 4

A non-woven fabric sheet of polypropylene and polyethylene, which was not sulfonated, was applied with a surface active agent of polyoxyethylene nonylphenol in an amount of about 0.5 wt % based of the total weight of the non-woven fabric sheet to obtain a separator material (Comparative Example 3). Moreover, a non-woven fabric of polypropylene and polyethylene was immersed in fuming sulfuric acid having a concentration of 20% at a temperature of 35° C. for 30 minutes, washed with water and dried to obtained a hydrophilic separator material (Comparative Example 4).

The separator materials obtained in Examples 4 to 6 and Comparative Examples 3,4 and a known polyamide non-woven fabric sheet separator as used in the foregoing examples were each cut into 5 pieces with a width of 50 mm. The tip of the respective pieces was immersed in a 30 wt % potassium hydroxide aqueous solution and a height of drawing up of the solution was checked at the time when one minute passed after the immersion. The results are shown in Table 3.

TABLE 3

| Separator Material | Height of Drawn-up Solution (mm/minute) |
|---|---|
| Example 4 | 26 |
| Example 5 | 31 |
| Example 6 | 27 |
| Com. Ex. 3 | 30 |
| Com. Ex. | 27 |
| Polyamide Non-woven Fabric Sheet | 26 |

The above results reveal that the separator materials of Examples 4 to 6 exhibit similar affinity for the electrolytic solution as the materials obtained in Comparative Examples 3, 4 and the polyamide non-woven fabric sheet and that the sulfonation within a short time is effective. Moreover, the immersion in the alkaline aqueous solution as in Example 5 contributes to further improvement of the affinity.

In general, the sulfonation leads to a lowering of mechanical strength due to the oxidation of polyolefins. The samples of the respective separator materials having a width of 20 mm and a length of 35 mm were made and pulled along the length to determine a breaking load. The results are shown in Table 4, in which the values indicated are each an average of five measurements.

The results of Table 4 reveal that the materials obtained in Examples 4 to 6 have satisfactory mechanical strength which is greater than the mechanical strength of the material of Comparative Examples 4 having similar affinity for the electrolytic solution and treated with fuming sulfuric acid. The reason for this is considered as follows: when the sulfonation treatment is effected using a reactive gas within a short time as in Examples 4 to 6, the sulfonation proceeds only on and in the vicinity of the surface layer of the resin fibers, not in the inside of the fibers.

The separator materials obtained in Examples 4 to 6 and Comparative Examples 2 to 4, and the polyamide resin fiber separator were each applied as a separator to a nickel-cadmium storage battery of a general-purpose AA size. After full charging, the respective batteries were allowed to stand at 45° C. for 1 month to determine a self discharge characteristic. The results are also shown in Table 4. The self discharge characteristic is evaluated as a ratio of a discharge capacity prior to the standing and a discharge capacity after the standing determined under the same test conditions, i.e. a ratio of capacity retentions prior to and after the standing.

The results of Table 4 demonstrate that the batteries using the separator materials of Examples 4 to 6 are very small in the self discharge with a small range of scattering. The battery using the separator material obtained in Comparative Example 2 wherein the sulfonation was effected in the same manner as in the examples of the invention but the after-treatment was not effected is higher in self discharge than the batteries using the materials of Examples 4 to 6. In addition, the results are more scattered in the comparative example. This is because the separator materials obtained in Examples 4 to 6 are after-treated, thereby removing impurities formed by the sulfonation treatment.

TABLE 4

| Sample | Breaking Load (kg) | Residual Capacity Rate (%) |
|---|---|---|
| Example 4 | 7.1 | 68-70 |
| 5 | 7.2 | 69-72 |
| 6 | 7.2 | 69-71 |
| Com. Ex. 2 | 7.0 | 62-68 |
| 3 | 8.5 | 50-56 |
| 4 | 6.5 | 69-71 |
| Polamide Non-woven Fabric Sheet | 6.5 | 20-25 |

EXAMPLE 7

Non-woven fabric sheets of polypropylene resin fibers forming a polyethylene resin layer on the surfaces of the individual fibers in the same manner as in Examples 4 to 6 were accommodated in a reaction container, followed by evacuation of the air to vacuum. Thereafter, dried air containing 20 vol % of a sulfur trioxide gas was charged into the container to an atmospheric pressure, followed by reaction at 25° C. for 5 minutes. The reaction gas in the container was completely replaced by air and the sheet was withdrawn. Thereafter, the sheet was immersed in an about 10 wt % dilute sulfuric acid aqueous solution for about 10 minutes, followed by washing with water and drying, thereby obtaining a hydrophilic separator material. Similar to Examples 4 to 6, the sheet was subjected to measurement of hydrophilicity, mechanical strength and self discharge characteristic. As a result, it was found that the height of the drawn-up solution was 27 mm/minute, the breaking load was 7.1 kg and the capacity retention was 68-71%. These values were similar to those attained by the case were a nitrogen gas was used as a dilution gas. This has a great industrial merit.

In Examples 4 to 7, the non-woven fabric sheets were used and similar results were obtained using woven fabric sheets.

EXAMPLE 8

A polyethylene powder having an average size of 1.5 micrometers was immersed in fuming sulfuric acid having a concentration of 20 vol % at a temperature of 35° C. for about 10 minutes, followed by washing with water and drying to obtain sulfonated polyethylene powder. Assemblies of polypropylene fibers having an average diameter of about 15 micrometers and an average length of about 40 mm were loosened and dispersed to form a web. The web was uniformly applied with a dispersion of the sulfonated polyethylene powder in tetrahydrofuran, thereby imparting adhesion to the polypropylene fibers. The applied web was passed between hot rolls kept at a temperature of 150° C. to thermally bond the fibers. The resultant sheet had a thickness of 0.2 micrometers, a porosity of 60%, and an amount of the sulfonated polyethylene of 20% based on the weight of the polypropylene fibers. During the course of the formation of the sheet, the solvent used to disperse the polyethylene powder was evaporated, so that the sheet material was substantially composed of the polypropylene fibers individually covered with the sulfonated polyethylene layer.

Figure 4:
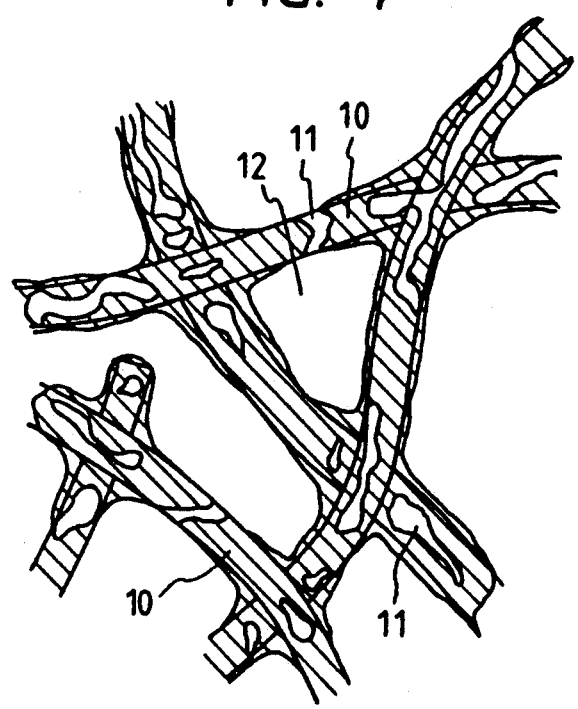
FIG. 4 is a schematic enlarged view of a separator material obtained in Example 7.

FIG. 4 shows a schematic enlarged view of the sheet material obtained above, in which reference numeral 10 indicates the sulfonated polyethylene layer, reference numeral 11 indicates an exposed portion of the polypropylene fiber, and reference numeral 12 indicates spaces.

EXAMPLE 5

The general procedure of Example 8 was repeated except that the polyethylene powder used has an average size of 15 micrometers and was not sulfonated, thereby obtaining a non-woven fabric sheet.

The non-woven fabric sheet materials obtained in Example 8 and Comparative Example 5 were each cut into pieces having a width of 20 mm and a length of 35 mm. The pieces were pulled along the length to determine a breaking load. The results are shown in Table 5. The values of Table 5 are each an average of five measurements.

TABLE 5

| Sample | Breaking Load (kg) |
| --- | --- |
| Material of Ex. 8 | 9.8 |
| Material of Com. Ex. 5 | 10.0 |

From the results of Table 5, it will be seen that the sheet material obtained in Example 8 rarely involves a lowering of strength as will be caused by the sulfonation and is similar in the breaking load to the sheet obtained in Comparative Example 5 where the polyethylene powder used was not sulfonated.

In order to check a variation in mechanical strength of non-woven fabric sheets using different degrees of sulfonation of the polyethylene powder, sulfonated polyethylene powders obtained by changing the time of immersion in fuming sulfuric acid were used to make separator materials. These materials were each subjected to measurement of a breaking load in the same manner as described above. The results are shown in Table 6.

COMPARATIVE EXAMPLES 6, 7

Non-woven fabric sheets constituted of polyethylene fibers alone having an average diameter of 15 micrometers (Comparative Example 6) and polypropylene fibers alone, respectively, were each immersed in fuming sulfuric acid under the same conditions as in Example 8 but using different immersion times, thereby obtaining sulfonated materials. The materials were also subjected to measurement of a breaking load in the same manner as in Example 8, with the results shown in Table 6.

TABLE 6

| | Breaking Load (kg) Immersion Time For Sulfonation (minutes) | | | | | | |
| --- | --- | --- | --- | --- | --- | --- | --- |
| Material | 0 | 5 | 10 | 20 | 30 | 40 | 60 |
| Material Obtained in Example 8 | 10.0 | 10.0 | 9.8 | 9.8 | 9.5 | 8.9 | 8.0 |
| Material Obtained in Com. Ex. 7 | 10.0 | 9.8 | 8.5 | 7.5 | 6.2 | 2.8 | 0.5 |
| Material Obtained in Com. Ex. 6 | 6.4 | 5.8 | 3.2 | 0.5 | — | — | — |

The values in the above table are, respectively, an average of five measurement.

From the results of the table, it will be seen that the separator material obtained in Example 8 does not lower so great as in the comparative examples when changing the immersion time in the fuming sulfuric acid. Thus, the strength is relatively stable. Judging from the standard that the breaking load of about 6 kg/cm$^2$ is necessary from the industrial point of view, the immersion time is within 5 minutes for the sheet of the polyethylene fibers alone (Comparative Example 6) and within about 30 minutes for the sheet of the polypropylene fibers alone (Comparative Example 7). In contrast, no problem of the strength encounters for the material of in Example 8 even when the immersion time is as long as 60 minutes. Thus, a very wide range of the immersion time is allowed in the practice of the invention.

Presumably, this is because with the sheet materials of the comparative examples, the polyethylene or polypropylene fibers are oxidized and even carbonized with a lowering of the strength. The material obtained in Example 8 undergoes little sulfonation with respect to the polypropylene fibers but the polyethylene surface layer alone which may contribute to improvement of the breaking load as an adhesive has been sulfonated.

The time of immersion of the polyethylene powder in fuming sulfuric acid was tested from the standpoint of hydrophilicity, from which it was found that when the powder was immersed for 10 minutes or over, a satisfactory degree of hydrophilicity not impeding charge and discharge of storage batteries could be imparted. In contrast, the material obtained in Comparative Example 5 did not show any hydrophilicity unless a surface active agent was applied. With the material obtained in Comparative Example 7, an immersion time of about 30 minutes or over was necessary.

Figure 5:
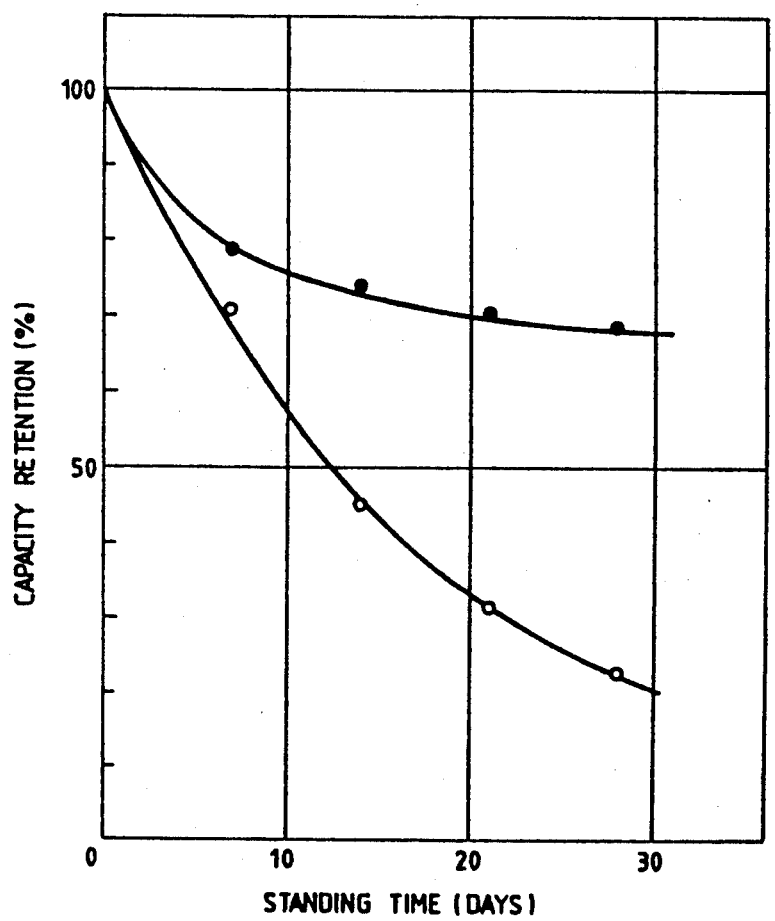
FIG. 5 is a graphical representation of a self discharge characteristic of nickel-cadmium storage batteries (AA size) using the separator obtained in Example 7 and an ordinary polyamide separator, respectively.

The separator material obtained in Example 8 using an immersion time of 10 minutes was applied a separator to a nickel-cadmium storage battery of a general-purpose AA size. After full charge, the battery was allowed to stand at 45° C. to check a self discharge characteristic. This is indicated in FIG. 5 as curve c. The curve d in the figure is a self discharge characteristic of a nickel-cadmium storage battery using a known polyamide separator.

As will be apparent from the figure, the battery using the separator obtained in Example 8 exhibited a very small self discharge characteristic, i.e. after standing at 45° C. for about 1 month, the residual capacity was as high as about 68%. In Example 8, the non-woven fabric sheet was used, and similar results were obtained when using woven fabric sheets.

The separator materials according to the invention may be applied not only to alkaline storage batteries using alkaline aqueous solutions, e.g. nickel-cadmium storage batteries and nickel-hydrogen storage batteries, but also storage batteries using other aqueous electrolytic solutions or organic electrolytes. Since the separator material have good chemical stability and good affinity for electrolytic solution, the shelf life and electrolyte filling properties of storage batteries using the material are effectively improved.

What is claimed is:

1. A method for making a separator material which is useful as a separator for storage batteries, the method comprising the following steps:
   a) providing polyolefin resin fibers made of a first polyolefin resin;
   b) forming on surfaces of individual ones of said polyolefin fibers a surface layer made of a second polyolefin resin which is more susceptible to sulfonation than the first polyolefin resin from which said;
   c) forming a woven or non-woven fabric sheet from the resulting fibers;
   d) subjecting the fabric sheet to a sulfonation process until the surface layer formed in step b) is sulfonated; and
   e) removing a decomposition product formed by the sulfonation process from the fabric sheet to obtain a separator material having the sulfonated surface layer formed in step d) on individual ones of said polyolefin resin fibers.

2. A method according to claim 1, wherein the surface layer formed in step b) is formed on individual ones of said fibers by applying a dispersion of a powder of the second polyolefin resin in a volatile solvent to said fibers.

3. A method according to claim 1, wherein said fibers are formed by a molding process wherein each fiber has a core of said first polyolefin resin and a sheath of said second polyolefin resin which is formed on the core.

4. A method according to claim 1, wherein the sulfonation process is effected in an atmosphere containing an $SO_3$ gas.

5. A method according to claim 4, wherein the content of the $SO_3$ gas is from 15 to 30 vol %.

6. A method according to claim 1, wherein the sulfonation process is effected in fuming or concentrated sulfuric acid.

7. A method according to claim 1, wherein the removal of the decomposition product is effected by immersing the resultant fabric sheet in water.

8. A method according to claim 1, wherein the resultant fabric sheet is immersed in a dilute sulfuric acid solution, washed with water and dried.

9. A method according to claim 1, wherein the resultant fabric sheet is immersed in an alkaline aqueous solution, washed with water and dried.

10. A method according to claim 1, wherein the resultant fabric sheet is immersed in water or a dilute sulfuric acid, further immersed in an alkaline aqueous solution, washed with water and dried.

11. A method according to claim 1, wherein said polyolefin fibers are formed into the non-woven fabric sheet by a pressing process.

12. A method for making a separator material which is useful as a separator for storage batteries, the method comprising the following steps:
   a) providing polyolefin resin fibers;
   b) applying a dispersion of a sulfonated polyolefin resin powder in a volatile solvent on surfaces of individual ones of said resin fibers;
   c) forming a woven or non-woven fabric sheet from the resulting fibers and;
   d) subjecting the fabric sheet to thermal treatment to deposit said sulfonated polyolefin resin as a surface layer on said individual ones of said fibers of said fabric sheet.

13. A method according to claim 12, wherein said sulfonated polyolefin resin powder has a particle size of from 0.5 to 2.0 micrometers.

14. A method according to claim 12, wherein said polyolefin resin fibers are polypropylene fibers and the sulfonated polyolefin resin powder is a sulfonated polyethylene powder or a sulfonated ethylene-propylene copolymer powder.

15. A method according to claim 12, wherein said sulfonated polyolefin resin powder is a sulfonated polypropylene resin powder.

16. A method according to claim 12, wherein the polyolefin resin fibers are covered with the sulfonated polyolefin resin in an amount of not less than 85% of the total surface area of the fibers.

17. A method for making a separator material which is useful as a separator for storage batteries, the method comprising following steps:
   a) providing polypropylene resin fibers;
   b) subjecting the polypropylene resin fibers to a surface treatment process to form hydrophilic groups on the surfaces of the polypropylene resin fibers;
   c) forming a woven or non-woven fabric sheet from the polypropylene resin fibers;
   d) subjecting the fabric sheet to a sulfonation process, thereby forming a sulfonated surface layer on the individual polypropylene resin fibers, and;
   e) removing a decomposition product formed by the sulfonation process from the fabric sheet to obtain a separator material having a sulfonated surface layer on individual polypropylene resin fibers.

18. A method according to claim 17, wherein the surface treatment is effected by irradiation of plasma or by sputtering.

19. A method according to claim 17, wherein the sulfonation process is effected in an atmosphere containing an $SO_3$ gas.

20. A method according to claim 19, wherein the content of the $SO_3$ gas is from 15 to 30 vol %.

21. A method according to claim 17, wherein the sulfonation process is effected in fuming or concentrated sulfuric acid.

22. A method according to claim 17, wherein the removal of the decomposition product is effected by immersing the resultant fabric sheet in water.

23. A method according to claim 17, wherein the resultant fabric sheet is immersed in a dilute sulfuric acid solution, washed with water and dried.

24. A method according to claim 17, wherein the resultant fabric sheet is immersed in an alkaline aqueous solution, washed with water and dried.

25. A method according to claim 17, wherein the resultant fabric sheet is immersed in water or a dilute sulfuric acid, further immersed in an alkaline aqueous solution, washed with water and dried.

26. A method according to claim 17, wherein said polyolefin fibers are formed into the non-woven fabric sheet by a pressing process.

27. A method for making a separator material which is useful as a separator for storage batteries, the method comprising the following steps:

a) providing a woven or non-woven fabric sheet of polyolefin resin fibers made of a first polyolefin resin;
b) forming on surfaces of individual ones of said polyolefin fibers a surface layer made of a second polyolefin resin which is more susceptible to sulfonation than the first polyolefin resin from which said fibers are made;
c) subjecting the fabric sheet to a sulfonation process until the surface layer formed in step b) is sulfonated; and
d) removing a decomposition product formed by the sulfonation process from the fabric sheet to obtain a separator material having the sulfonated surface layer formed in step c) on individual ones of said polyolefin resin fibers.

28. A method according to claim 27, wherein the surface layer formed in step b) is formed on individual ones of said fibers by applying a dispersion of a powder of the second polyolefin resin in a volatile solvent onto the woven or non-woven fabric sheet.

29. A method according to claim 27, wherein said fibers are formed by a molding process wherein each fiber has a core of said first polyolefin resin and a sheath of said second polyolefin resin which is formed on the core.

30. A method according to claim 27, wherein the sulfonation is effected in an atmosphere containing an $SO_3$ gas.

31. A method according to claim 30, wherein the content of the $SO_3$ gas is from 15 to 30 vol %.

32. A method according to claim 27, wherein the sulfonation is effected in fuming or concentrated sulfuric acid.

33. A method according to claim 27, wherein the removal of the decomposition product is effected by immersing the resultant fabric sheet in water.

34. A method according to claim 27, wherein the resultant fabric sheet is immersed in a dilute sulfuric acid solution, washed with water and dried.

35. A method according to claim 27, wherein the resultant fabric sheet is immersed in an alkaline aqueous solution, washed with water and dried.

36. A method according to claim 27, wherein the resultant fabric sheet is immersed in water or a dilute sulfuric acid, further immersed in an alkaline aqueous solution, washed with water and dried.

37. A method according to claim 27, wherein said polyolefin fibers are formed into the non-woven fabric sheet by pressing.

38. A method for making a separator material which is useful as a separator for storage batteries, the method comprising the following steps:
a) providing a woven or non-woven fabric sheet of polyolefin resin fibers;
b) applying a dispersion of a sulfonated polyolefin resin powder in a volatile solvent on surfaces of individual ones of said resin fibers;
c) subjecting the fabric sheet to thermal treatment to deposit said sulfonated polyolefin resin as a surface layer on said individual ones of said fibers of said fabric sheet.

39. A method according to claim 38, wherein said sulfonated polyolefin resin powder has a particle size of from 0.5 to 2.0 micrometers.

40. A method according to claim 38, wherein said polyolefin resin fibers are polypropylene fibers and the sulfonated polyolefin resin powder is a sulfonated polyethylene powder or a sulfonated ethylene-propylene copolymer powder.

41. A method according to claim 38, wherein said sulfonated polyolefin resin powder is a sulfonated polypropylene resin powder.

42. A method according to claim 38, wherein the polyolefin resin fibers are covered with the sulfonated polyolefin resin in an amount of not less than 85% of the total surface area of the fibers.

43. A method for making a separator material which is useful as a separator for storage batteries, the method comprising the following steps:
a) providing a woven or non-woven fabric sheet of polypropylene resin fibers;
b) subjecting the polypropylene resin fibers to a surface treatment process to form hydrophilic groups on the surfaces of the polypropylene resin fibers;
c) subjecting the fabric sheet to a sulfonation process, thereby forming a sulfonated surface layer on the individual polypropylene resin fibers, and;
d) removing a decomposition product formed by the sulfonation process from the fabric sheet to obtain a separator material having a sulfonated surface layer on individual polypropylene resin fibers.

44. A method according to claim 43, wherein the surface treatment is effected by irradiation of plasma or by sputtering.

45. A method according to claim 43, wherein the sulfonation process is effected in an atmosphere containing an $SO_3$ gas.

46. A method according to claim 45, wherein the content of the $SO_3$ gas is from 15 to 30 vol %.

47. A method according to claim 43, wherein the sulfonation process is effected in fuming or concentrated sulfuric acid.

48. A method according to claim 43, wherein the removal of the decomposition product is effected by immersing the resultant fabric sheet in water.

49. A method according to claim 43, wherein the resultant fabric sheet is immersed in a dilute sulfuric acid solution, washed with water and dried.

50. A method according to claim 43, wherein the resultant fabric sheet is immersed in an alkaline aqueous solution, washed with water and dried.

51. A method according to claim 43, wherein the resultant fabric sheet is immersed in water or a dilute sulfuric acid, further immersed in an alkaline aqueous solution, washed with water and dried.

52. A method according to claim 43, wherein said polyolefin fibers are formed into the non-woven fabric sheet by a pressing process.

* * * * *